United States Patent
Brandl et al.

(10) Patent No.: US 11,394,279 B2
(45) Date of Patent: Jul. 19, 2022

(54) HYBRID SQUIRREL-CAGE ROTOR

(71) Applicant: Siemens Aktiengesellschaft, Munich (DE)

(72) Inventors: Konrad Brandl, Thalmassing (DE); Johannes Grosshauser, Wendelstein (DE); Maximilian Pfaller, Feucht (DE); Uwe Scharf, Schwabach (DE); André Trepper, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 380 days.

(21) Appl. No.: 16/498,889

(22) PCT Filed: Mar. 13, 2018

(86) PCT No.: PCT/EP2018/056198
§ 371 (c)(1),
(2) Date: Sep. 27, 2019

(87) PCT Pub. No.: WO2018/177737
PCT Pub. Date: Oct. 4, 2018

(65) Prior Publication Data
US 2021/0036587 A1     Feb. 4, 2021

(30) Foreign Application Priority Data
Mar. 29, 2017   (EP) .................................. 17163538

(51) Int. Cl.
*H02K 17/16* (2006.01)
*H02K 15/00* (2006.01)

(52) U.S. Cl.
CPC ....... *H02K 15/0012* (2013.01); *H02K 17/165* (2013.01)

(58) Field of Classification Search
CPC .................. H02K 15/0012; H02K 17/165
See application file for complete search history.

(56) References Cited

U.S. PATENT DOCUMENTS

| 4,885,494 A | 12/1989 | Higashi |
| 4,970,424 A | 11/1990 | Nakamura et al. |
| 5,467,521 A | 11/1995 | Nakamura et al. |
| 2010/0007234 A1 | 1/2010 | Alfermann et al. |

(Continued)

FOREIGN PATENT DOCUMENTS

| CN | 1452293 A | 10/2003 |
| CN | 1925283 A | 3/2007 |

(Continued)

OTHER PUBLICATIONS

PCT International Search Report and Written Opinion of International Searching Authority dated Jun. 7, 2018 corresponding to PCT International Application No. PCT/EP2018/056198 filed Mar. 13, 2018.

*Primary Examiner* — Thomas Truong
(74) *Attorney, Agent, or Firm* — Henry M. Feiereisen LLC

(57) ABSTRACT

The invention relates to a squirrel-cage rotor of an asynchronous machine (1), comprising conductors (9) in grooves (12) of a magnetic field-conducting rotor, and electrically conducting rotor end rings (6) which are located in the region of the end faces of the magnetic field-conducting rotor, electrically connect the conductors (9) and have at least two materials that conduct electricity differently.

22 Claims, 2 Drawing Sheets

(56) References Cited

U.S. PATENT DOCUMENTS

2015/0349616 A1    12/2015  Buttner et al.
2016/0294264 A1*  10/2016  Pfaller ................ H02K 17/165

FOREIGN PATENT DOCUMENTS

| CN | 101626179 A | 1/2010 |
|----|-------------|--------|
| EP | 0341317 A1 | 11/1989 |
| EP | 0 642 208 A1 | 3/1995 |
| EP | 2 874 288 A1 | 5/2015 |
| EP | 2 953 245 A1 | 12/2015 |
| JP | H0865934 A | 3/1996 |

* cited by examiner

HYBRID SQUIRREL-CAGE ROTOR

CROSS-REFERENCES TO RELATED APPLICATIONS

This application is the U.S. National Stage of International Application No. PCT/EP20181056198, filed Mar. 13, 2018, which designated the United States and has been published as International Publication No, WO 2018/177737 A1 and which claims the priority of European Patent Application, Serial No. 17163538.6, filed Mar. 29, 2017, pursuant to 35 U.S.C. 119(a)-(d).

BACKGROUND OF THE INVENTION

The invention relates to a squirrel-cage rotor of an asynchronous machine, the asynchronous machine, the use of this asynchronous machine and a method for producing a squirrel-cage rotor of an asynchronous machine.

Squirrel-cage rotors of asynchronous machines are normally made in die-cast aluminum. In the case of large volumes and casting cross-sections, however, the solidification shrinkage and the low replenishing of the casting material occur during the casting process in the region of the conductors and the rotor end ring which, among other things, considerably reduce the electrically conductive cross-section.

Depending on the location and size of the voids in the squirrel-cage rotor, this can affect the functionality of the asynchronous motor. In this case, the voids in the rotor end ring have proved to be particularly critical in the region of the transition to the rotor bars.

This problem has hitherto been counteracted on the side of the rotor facing away from the inlet side of the metal melt by a weakened geometry of the casting tool, which is contrary to a compact design of the squirrel cage rotor and thus of an asynchronous machine.

The object of the invention is therefore to create a compact, energy-efficient squirrel-cage rotor which is also suitable for larger asynchronous machines (axle height greater than 500) and is distinguished by a compact design of asynchronous machines. Furthermore, a simple manufacturing method of this squirrel-cage rotor which provides a reproducible quality of the squirrel-cage rotor should be provided.

SUMMARY OF THE INVENTION

The set object is achieved by means of a squirrel-cage rotor of an asynchronous machine, comprising conductor rods in grooves of a magnetic field-conducting rotor, and electrically conducting rotor end rings which are located in the region of the end faces of the magnetic field-conducting rotor, which electrically connect the conductor rods and have at least two materials that conduct electricity differently.

The set object is likewise achieved by an asynchronous machine comprising a squirrel-cage rotor according to the invention.

The set object is likewise achieved by the use of an asynchronous machine comprising a squirrel-cage rotor according to the invention as a drive in the food industry, the raw materials industry or the clothing industry.

The object is likewise achieved by a method for producing a squirrel-cage rotor according to the invention by means of the following steps:
providing a magnetic field-conducting rotor,
providing a mold which serves as a template for the contour of a rotor end ring of the squirrel-cage rotor and is arranged in the region of the end faces of the magnetic field-conducting rotor,
in this case, at least one insert part made of a second electrically conductive material is inserted at least into the mold,
pouring of metal melt from a first electrically conductive material into the grooves or remaining groove spaces and into the remaining spaces of the rotor end ring between the inner contour of the casting mold and the insert part, allowing the metal melt to solidify.

A squirrel-cage rotor has the following sections and elements. A magnetic field-conducting element made of sintered material or sheets arranged one behind the other, in particular, in the quality and thickness predetermined for dynamo sheets. This magnetic field-conducting element is essentially cylindrical in design and in the region of its lateral surface has grooves extending from one end face to the other, which are closed towards the lateral surface or half open or open. Conductors are arranged in the grooves. Rotor end rings are provided directly adjacent to or axially spaced from the end faces, which electrically short-circuit the conductors at the end faces.

The rotor end ring is composed of an insert part made of a second electrically conductive material, for example, a copper part, which is surrounded by a melt of a first electrically conductive material, for example, an aluminum melt.

The conductors are either made of a first electrically conductive material or an insert part, conductor rod made of a second electrically conductive material, for example, a copper rod, which is surrounded by a melt of the first electrically conductive material, for example, an aluminum melt.

According to the invention, in order to avoid voids in the rotor end ring, in particular, in the transition between the conductor and the rotor end ring, the casting volume or casting cross-section is reduced by an insert part, wherein in particular the insert part of the rotor end ring has better electrical conductivity than the cast-in material.

This is possible, in particular, as a result of the use of copper in comparison to aluminum casting. The cross-section of the comparatively poor conductive material in the cast part is thus proportionately reduced, wherein the necessary structural space of the squirrel-cage rotor and thus for the asynchronous machine is also reduced.

The firm bonding of the insert part made of copper with the cast aluminum is advantageously carried out by means of a low-melting phase. A coating of the at least one insert part both of the rotor end ring and the at least one insert part (conductor rod) of the respective groove with tin supports the kinetics of the phase reaction under the process-related boundary conditions. It is therefore also possible in particular on the side of the squirrel-cage rotor facing away from the filling side to realize a process-safe and energy-efficient connection of the aluminum cast to the insert part.

According to the invention, the formation of voids is thus also prevented in the case of larger casting volumes and casting cross-sections, such as occur, for example, with greater axle heights (greater than 400 mm over 800 mm up to 1200 mm and beyond). This also makes it possible to produce comparatively large squirrel-cage rotors with cast cages.

As a result of the insert parts, the excess weight of aluminum melt can now be reduced as less "volume has to be filled". This means that production can continue to operate with the systems which have proven successful in smaller squirrel-cage rotors. Thus, tool design is also simple and less expensive, and the rotor end ring can be provided with a comparatively simpler geometry.

By inserting the insert part into the rotor end ring, which has better electrical conductivity than the aluminum, a reduction in the cross-section of the rotor end ring is now achieved. This reduces the space, in particular axial space, required in both directions, which can then possibly be used for a more compact design of the drive or for improved engine cooling.

The use of the insert part in the rotor end ring, which has increased electrical conductivity, also reduces the electrical losses in the squirrel-cage rotor, which leads to increased energy efficiency of the asynchronous motor.

In a further embodiment, in addition to the aluminum melt, insert parts, in particular conductor rods, are used as conductors in the grooves. The copper rods are then arranged in the grooves which then together with the aluminum melt in the rotor end rings and their at least one insert part form an electrically conductive cage of the squirrel-cage rotor.

The short-circuit rods and insert parts made of copper meet the requirements with regard to an electrically high conductance and thus bring about a good electrical efficiency for the entire asynchronous machine. Aluminum is suitable for the casting process because of its comparatively low melting point at 660° C., since, therefore, and during casting, relatively low demands must be placed on the tool used.

This material selection furthermore has the advantage that the squirrel-cage rotor can be made relatively easily by the rotor end rings made of aluminum and copper. This leads to a lower moment of inertia, which has a positive effect on the starting behavior of the asynchronous motor. This advantage is decisive in particular in the case of drives in which frequent changes in the direction of rotation occur, such as, for example, geared motors in reversing operation or motors in machine tools, etc.

Due to the described changes in direction of rotation and also load changes to which an asynchronous machine is exposed in operation, the cage rotor is also subject to temperature fluctuations which in turn can produce mechanical stress effects in the squirrel-cage rotor. Such loads can lead to a breakaway of the conductors from the rotor end rings with insert parts. If the connection between the short-circuit rods and the cast-in insert parts is released, the electrical resistance at the connection point is increased.

This increase in the transition resistance again has negative effects on the overall efficiency of the asynchronous machine. In order to be able to form these compounds in a stable manner, the insert parts are partially coated before they are introduced into the casting mold.

In this case, for example, a coating process is used here which effects an alloy layer between the metal melt and the insert parts of the rotor end ring. An alloy layer of this type is advantageously applied by electroplating. A stable alloy layer can already be achieved with a comparatively thin layer thickness by electroplating.

The alloy layer is characterized by the fact that a mixed crystalline compound is formed between the rods and the rotor end rings. As a result, the bonding forces between the rotor end rings and the conductor rods are considerably increased. The reinforcement of the bond between the conductor rods and the insert parts can be further improved in an advantageous embodiment of this invention by the insert parts being at least partially coated in advance with the material of which the metal melt consists.

If, for example, the insert parts made of copper are used and a metal melt of aluminum, then the insert parts are covered by a thin aluminum layer with the aid of a galvanization method. After the insert parts are placed in the casting mold of the rotor end ring and optionally in the grooves, the insert parts coated in this way are brought into contact with the aluminum melt in order to electrically contact the conductors and the rotor end rings with the insert parts.

The resulting squirrel-cage rotor is significantly more robust with respect to load changes and the associated temperature fluctuations.

BRIEF DESCRIPTION OF THE DRAWING

The invention and advantageous embodiments of the invention are explained in more detail with reference to an exemplary embodiment shown in principle. In the drawings.

DETAILED DESCRIPTION OF PREFERRED EMBODIMENTS

Figure 1:
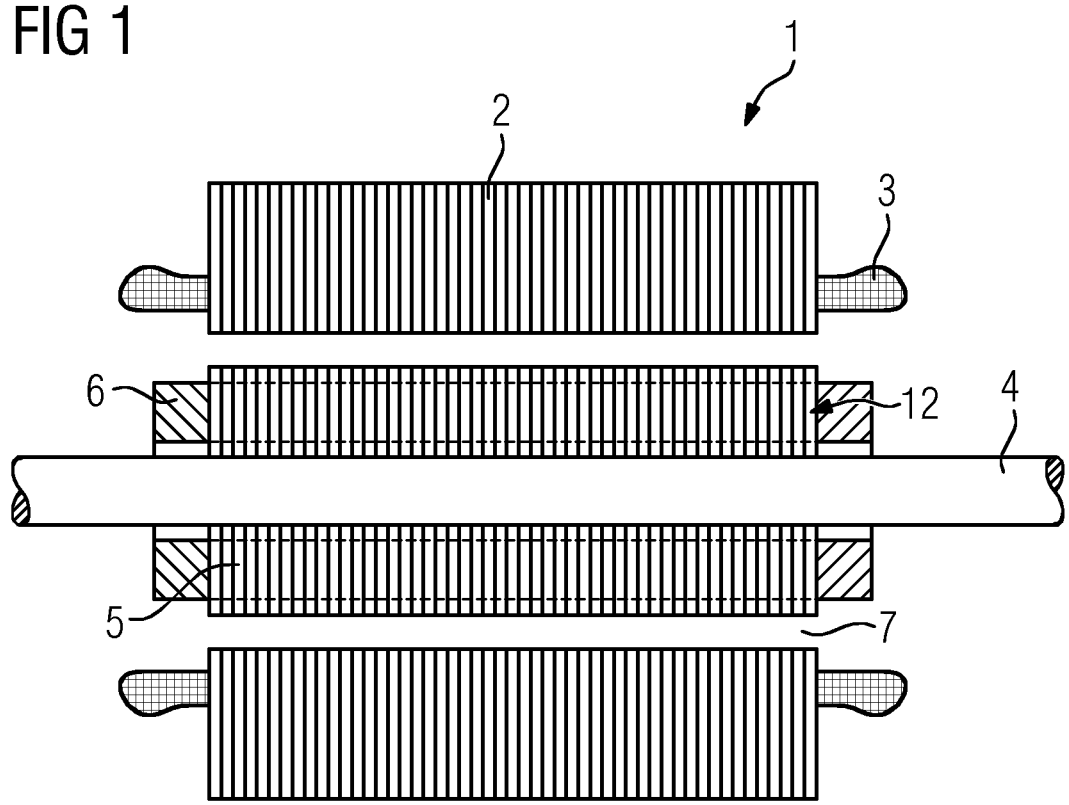
FIG. 1 shows a longitudinal section through an asynchronous machine with a squirrel-cage rotor.

FIG. 1 shows a dynamoelectric machine, in this case an asynchronous machine 1 comprising a squirrel-cage rotor 5 or rotor, which has a stator 2 the grooves of which, not shown in more detail and facing an air gap 7, have a winding system 3 which interacts electromagnetically with a squirrel-cage rotor 5 and thus causes a rotation of a shaft 4.

In order now to obtain a robust, compact and highly efficient asynchronous machine 1, in particular for greater axle heights greater than 400 mm in the rotor end ring 6, according to the invention the squirrel-cage rotor 5 is provided with at least one insert part 8 which is cast in a material, preferably aluminum melt, in the production process. In this case, the squirrel-cage rotor 5 has conductors 9 in essentially axially extending grooves 12 of the rotor which are formed from an aluminum melt. The rotor end ring 6 has an aluminum melt which at least partially surrounds an insert part 8, preferably made of copper.

A further embodiment is possible in that a copper insert part is located not only in the region of the rotor end ring 6, but also in the essentially axially extending grooves 12 of the rotor. The entire squirrel-cage rotor is thus essentially formed by insert parts in the groove and in the rotor end ring by a highly conductive material such as, for example, copper, which preferably has a coating that forms a metallurgical bond with the aluminum melt which at least partially surrounds these copper parts.

In this case, the end regions of the insert parts in the groove 10 of the rotor 5, that is to say the prefabricated conductor rods 10, are designed with a special shape, that is to say, for example, slotted. In this case, these end regions of the conductor rods 10 project into the rotor end ring 6.

Figure 2:
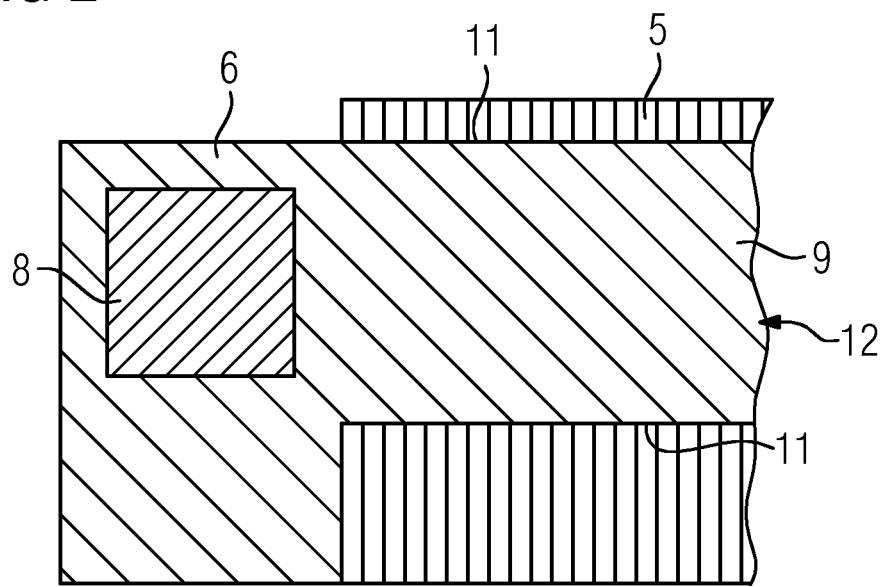
FIG. 2 shows a detail view of the squirrel-cage rotor in the region of the rotor end ring.

FIG. 2 shows in a detail view the insert part 8 in the rotor end ring 6. The insert part 8 has a virtually square cross-section and extends toroidally inside the rotor end ring 6. Particularly suitable are shapes of the insert parts 8 which on the sprue side—that is to say, the side from which the aluminum melt is fed—counteract the casting process with little flow resistance. On the other side of the squirrel-cage rotor 5, the insert part 8 is to be shaped in such a way that, among other things, it leads to a uniform distribution and to a laminar flow of the aluminum melt during production in order to prevent the formation of voids.

The squirrel-cage rotor 5, in particular, the short-circuit cage now has the following embodiment.

Either the conductors 9 are completely made of a cast material with an electrical conductivity lower than that of the insert part 8 in the rotor end ring 6. The rotor end ring 6 has an insert part 8 and molten material. For example, this embodiment of the squirrel-cage rotor 5 could have a copper-insert part 8 in the rotor end ring 6, in the remaining volume in the rotor end ring 6, that is to say, between the inner contour of a casting mold of the rotor end ring 6 and the insert part 8, as well as aluminum cast into the grooves 12 of the squirrel-cage rotor 5, as shown in FIG. 2.

Figure 3:
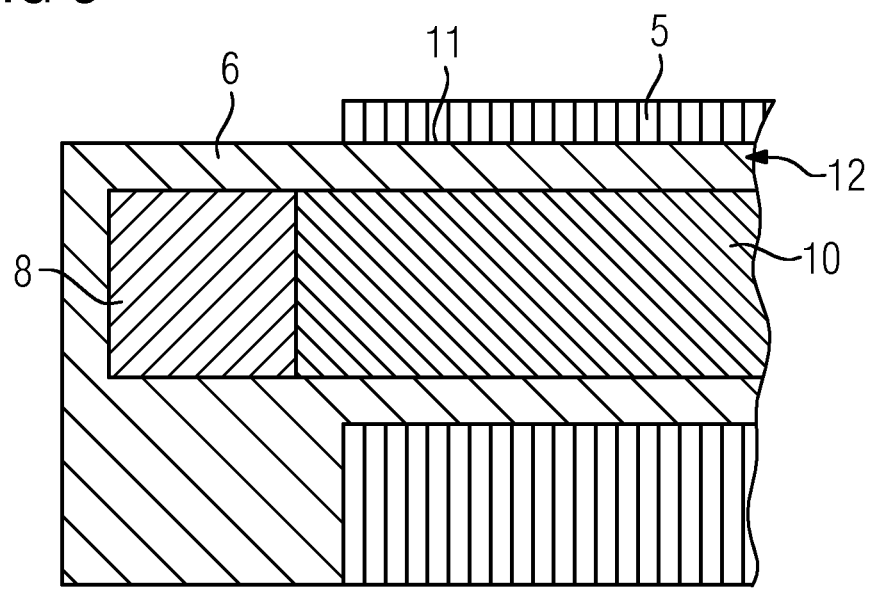
FIG. 3 shows a further detail view of the squirrel-cage rotor in the region of the rotor end ring.

Alternatively, the squirrel-cage rotor 5, in particular, the short-circuit cage according to FIG. 3, is designed as follows. In the grooves 12 of the squirrel-cage rotor 5, as well as in the rotor end ring 6, insert parts are made of a highly conductive material, for example, copper. The remaining cavities in the groove 12 between the inserted conductor rod 10 to the groove wall 11 and in the rotor end ring 6 between the insert part 8 and inner contour of a casting mold are filled with a material of lower electrical conductivity, that is to say, aluminum. The conductor rod 10 need not necessarily be in direct contact with the insert part 8 of the rotor end ring 6, as shown in FIG. 3.

In this case, for example, copper has an electrical conductivity of 58 MS/m, while the electrical conductivity of aluminum is in the region of 33.5 to 36 MS/m.

The rotor end ring 6 can in this case extend up to the shaft 4 in ail variants, in order to thereby obtain a heat-coupling to the shaft. In this case, the radial extent of the rotor end ring 6 is at most the distance from the shaft 4 to the radial outer edge of the laminated core of the squirrel-cage rotor 5. Normally, the radial extent of the rotor end ring 6 will be in between but not less than the radial height of the groove 12. The axial length of the rotor end ring 6—without any fan blades—corresponds at least to the axial thickness of the insert part 8.

It is also possible, in all variants of fan blades not shown in more detail, to cast on the side facing away from the laminated core of the squirrel-cage rotor 5.

The rotor end ring 6 can likewise be axially spaced apart from the laminated core of the squirrel-cage rotor 5 in all variants. This is ensured by suitable casting molds and, if appropriate, axially longer conductor rods 10.

Because of the greater axle heights, an asynchronous machine with such a squirrel-cage rotor 5 is suitable in particular for transport vehicles, machine tools or drives in the food industry, the raw materials industry, the packaging industry or the clothing industry.

The invention claimed is:

1. A squirrel-cage rotor of an asynchronous machine, comprising:
a magnetic field-conducting rotor having end faces and provided with grooves;
conductors disposed in the grooves of the magnetic field-conducting rotor;
electrically conducting rotor end rings located in a region of the end faces of the magnetic field-conducting rotor and electrically connecting the conductors, said rotor end rings including at least two electrically conductive materials that conduct electricity differently; and
an insert part provided in at least one of the rotor end rings and extending in a toroidal shape within the at least one of the rotor end rings, said insert part made of one of the electrically conductive materials and surrounded by a melt of another one of the electrically conductive materials.

2. The squirrel-cage rotor of claim 1, wherein the one of the electrically conductive materials is copper and the other one of the electrically conductive materials is aluminum.

3. The squirrel-cage rotor of claim 1, wherein the conductors are made of the other one of the electrically conductive materials, with a respective one of the conductors disposed in surrounding relationship to the insert part.

4. The squirrel-cage rotor of claim 1, wherein the conductors are embodied as conductor rods, with a respective one of the conductor rods made of the one of the electrically conductive materials and surrounded by the melt of the other one of the electrically conductive materials.

5. The squirrel-cage rotor of claim 1, further comprising a coating applied upon the insert part and configured to effect an alloy layer between the melt and the insert part.

6. The squirrel-cage rotor of claim 5, wherein the coating is made of the other one of the electrically conductive materials.

7. The squirrel-cage rotor of claim 1, wherein the insert part in the rotor end ring is shaped in terms of flow technology to prevent formation of voids.

8. The squirrel-cage rotor of claim 1, wherein the at least one of the rotor end rings includes a plurality of said insert part, said insert parts being identical.

9. A method for producing a squirrel-cage rotor as set forth in claim 1, said method comprising: placing an insert part made of one electrically conductive material into a casting mold; casting in the casting mold a rotor end ring in a region of an end face of a magnetic field-guiding rotor; pouring a metal melt made of another electrically conductive material into grooves or remaining groove spaces and into remaining spaces of the rotor end ring between an inner contour of the casting mold and the insert part; and allowing the metal melt to solidify.

10. The method of claim 9, further comprising inserting conductor rods made of a further electrically conductive material into the grooves before pouring of the metal melt.

11. The method of claim 10, wherein the further electrically conductive material is the one electrically conductive material.

12. The method of claim 10, wherein one of the conductor rods is sized to project axially into a region of the rotor end ring.

13. The method of claim 10, wherein the conductor rods have a slotted end region.

14. An asynchronous machine, comprising a squirrel-cage rotor, said squirrel-cage rotor comprising a magnetic field-conducting rotor having end faces and provided with grooves, conductors disposed in the grooves of the magnetic field-conducting rotor, electrically conducting rotor end rings located in a region of the end faces of the magnetic field-conducting rotor and electrically connecting the conductors, said rotor end rings including at least two electrically conductive materials that conduct electricity differently, and an insert part provided in at least one of the rotor end rings and extending in a toroidal shape within the at least one of the rotor end rings, said insert part made of one of the electrically conductive materials and surrounded by a melt of another one of the electrically conductive materials.

15. The asynchronous machine of claim 14, wherein the one of the electrically conductive materials is copper and the other one of the electrically conductive materials is aluminum.

16. The asynchronous machine of claim 14, wherein the conductors are made of the other one of the electrically conductive materials, with a respective one of the conductors disposed in surrounding relationship to the insert part.

17. The asynchronous machine of claim 14, wherein the conductors are embodied as conductor rods, with a respective one of the conductor rods made of the one of the electrically conductive materials and surrounded by the melt of the other one of the electrically conductive materials.

18. The asynchronous machine of claim 14, wherein the squirrel-cage rotor includes a coating applied upon the insert part and configured to effect an alloy layer between the melt and the insert part.

19. The asynchronous machine of claim 18, wherein the coating is made of the other one of the electrically conductive materials.

20. The asynchronous machine of claim 14, wherein the insert part hi the rotor end ring is shaped in terms of flow technology to prevent formation of voids.

21. The asynchronous machine of claim 14, wherein the at least one of the rotor end rings includes a plurality of said insert part, said insert parts being identical.

22. The asynchronous machine of claim 14, for use in a transport vehicle, a machine tool or a drive in food industry, in raw materials industry, packaging industry or clothing industry.

\* \* \* \* \*